(12) United States Patent
Fitzhardinge et al.

(10) Patent No.: US 10,474,654 B2
(45) Date of Patent: Nov. 12, 2019

(54) STRUCTURAL DATA TRANSFER OVER A NETWORK (71) Applicant: Exabox Corporation, Sunnyvale, CA (US)

(72) Inventors: Jeremy Fitzhardinge, San Francisco, CA (US); Kishore Udayashankar, Milpitas, CA (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 482 days.

(21) Appl. No.: 15/084,399

(22) Filed: Mar. 29, 2016

(65) Prior Publication Data
US 2017/0063990 A1    Mar. 2, 2017

Related U.S. Application Data (60) Provisional application No. 62/210,385, filed on Aug. 26, 2015.

(51) Int. Cl.
H04L 12/24    (2006.01)
G06F 16/22    (2019.01)
(Continued)

(52) U.S. Cl.
CPC .......... *G06F 16/2246* (2019.01); *G06F 16/16* (2019.01); *G06F 16/185* (2019.01);
(Continued)

(58) Field of Classification Search
CPC .... G06F 16/2246; G06F 16/21; G06F 16/289; G06F 16/16; G06F 16/13; G06F 16/185; H04L 67/1095; H04L 67/1097
(Continued)

(56) References Cited

U.S. PATENT DOCUMENTS 4,656,604 A    4/1987    van Loon
4,660,130 A    4/1987    Bartley et al.
(Continued)

FOREIGN PATENT DOCUMENTS

EP    1285354 A2    3/2004
EP    2575379 A1    4/2013
(Continued)

OTHER PUBLICATIONS

Non-Final Office Action, dated Nov. 5, 2013, U.S. Appl. No. 13/441,715, filed Apr. 6, 2012.
(Continued)

*Primary Examiner* — Moustafa M Meky
*Assistant Examiner* — Elizabeth Kassa
(74) *Attorney, Agent, or Firm* — Maschoff Brennan (57) ABSTRACT The methods and systems for transferring structural data over a network are provided. An example method includes providing storage operable to store a plurality of objects. The objects of the plurality of objects are immutable and include a data object or a metadata object including a list of references to further objects. The plurality of objects includes at least one root associated with a creation or an addition to the plurality of objects. The method also includes providing a further storage communicatively coupled with the storage via a network and configured to store a copy of the plurality of objects. The method includes determining a presence of a difference between the plurality of the objects and the copy. In response to the determination, the method transfers at least one object associated with the difference from the storage to the further storage.

16 Claims, 7 Drawing Sheets (51) Int. Cl.
*G06F 16/16* (2019.01)
*G06F 16/21* (2019.01)
*G06F 16/185* (2019.01)
*G06F 16/28* (2019.01)
*H04L 29/08* (2006.01)

(52) U.S. Cl.
CPC ............ *G06F 16/21* (2019.01); *G06F 16/289* (2019.01); *H04L 67/1095* (2013.01); *H04L 67/1097* (2013.01)

(58) Field of Classification Search
USPC ......................................................... 709/217
See application file for complete search history.

(56) References Cited

U.S. PATENT DOCUMENTS

| | | | |
|---|---|---|---|
| 5,420,999 A | 5/1995 | Mundy | |
| 5,561,778 A | 10/1996 | Fecteau et al. | |
| 5,899,996 A * | 5/1999 | Dysart | G06F 9/543 707/800 |
| 6,098,079 A | 8/2000 | Howard | |
| 6,154,747 A | 11/2000 | Hunt | |
| 6,167,437 A | 12/2000 | Stevens et al. | |
| 6,314,435 B1 | 11/2001 | Wollrath et al. | |
| 6,356,916 B1 | 3/2002 | Yamatari et al. | |
| 6,480,950 B1 | 11/2002 | Lyubashevskiy et al. | |
| 6,772,162 B2 | 8/2004 | Waldo et al. | |
| 7,043,494 B1 | 5/2006 | Joshi et al. | |
| 7,177,980 B2 | 2/2007 | Milillo et al. | |
| 7,197,622 B2 | 3/2007 | Torkelsson et al. | |
| 7,266,555 B1 | 9/2007 | Coates et al. | |
| 7,293,140 B2 | 11/2007 | Kano | |
| 7,392,421 B1 | 6/2008 | Bloomstein et al. | |
| 7,403,961 B1 | 7/2008 | Deepak et al. | |
| 7,454,592 B1 | 11/2008 | Shah et al. | |
| 7,509,360 B2 | 3/2009 | Wollrath et al. | |
| 7,539,836 B1 | 5/2009 | Klinkner | |
| 7,685,109 B1 | 3/2010 | Ransil et al. | |
| 7,725,437 B2 | 5/2010 | Kirshenbaum et al. | |
| 7,827,218 B1 | 11/2010 | Mittal | |
| 7,990,979 B2 | 8/2011 | Lu et al. | |
| 8,019,882 B2 | 9/2011 | Rao et al. | |
| 8,099,605 B1 | 1/2012 | Billsrom et al. | |
| 8,132,168 B2 | 3/2012 | Wires et al. | |
| 8,239,584 B1 | 8/2012 | Rabe et al. | |
| 8,364,887 B2 | 1/2013 | Wong et al. | |
| 8,407,438 B1 | 3/2013 | Ranade | |
| 8,447,733 B2 | 5/2013 | Sudhakar | |
| 8,572,290 B1 | 10/2013 | Mukhopadhyay et al. | |
| 8,868,926 B2 | 10/2014 | Hunt et al. | |
| 9,009,202 B2 | 4/2015 | Patterson | |
| 9,043,567 B1 | 5/2015 | Modukuri et al. | |
| 9,864,773 B1 * | 1/2018 | Feldman | G06F 17/30371 |
| 2002/0069340 A1 | 6/2002 | Tindal et al. | |
| 2002/0087590 A1 | 7/2002 | Bacon et al. | |
| 2003/0028514 A1 | 2/2003 | Ord et al. | |
| 2003/0028585 A1 | 2/2003 | Yeager et al. | |
| 2003/0056139 A1 | 3/2003 | Murray et al. | |
| 2003/0072259 A1 | 4/2003 | Mor | |
| 2003/0101173 A1 | 5/2003 | Lanzatella et al. | |
| 2003/0115408 A1 | 6/2003 | Milillo et al. | |
| 2004/0093361 A1 | 5/2004 | Therrien et al. | |
| 2004/0158588 A1 | 8/2004 | Pruet | |
| 2004/0167898 A1 | 8/2004 | Margolus et al. | |
| 2005/0071335 A1 | 3/2005 | Kadatch | |
| 2005/0080928 A1 | 4/2005 | Beverly et al. | |
| 2005/0081041 A1 | 4/2005 | Hwang | |
| 2005/0160170 A1 | 7/2005 | Schreter | |
| 2005/0256972 A1 | 11/2005 | Cochran et al. | |
| 2006/0039371 A1 | 2/2006 | Castro et al. | |
| 2006/0083247 A1 | 4/2006 | Mehta | |
| 2006/0156396 A1 | 7/2006 | Hochfield et al. | |
| 2006/0271540 A1 | 11/2006 | Williams | |
| 2007/0005746 A1 | 1/2007 | Roe et al. | |
| 2007/0130232 A1 * | 6/2007 | Therrien | G06F 8/71 |
| 2007/0136396 A1 * | 6/2007 | Kulkarni | G06F 8/71 |
| 2007/0203960 A1 | 8/2007 | Guo | |
| 2007/0230368 A1 | 10/2007 | Shi et al. | |
| 2007/0233828 A1 | 10/2007 | Gilbert | |
| 2007/0271303 A1 | 11/2007 | Menendez et al. | |
| 2007/0276838 A1 | 11/2007 | Abushanab et al. | |
| 2007/0276843 A1 | 11/2007 | Lillibridge et al. | |
| 2008/0005624 A1 * | 1/2008 | Kakivaya | H04L 67/104 714/47.1 |
| 2008/0016507 A1 | 1/2008 | Thomas et al. | |
| 2008/0126434 A1 | 5/2008 | Uysal et al. | |
| 2008/0133893 A1 | 6/2008 | Glew | |
| 2008/0147872 A1 | 6/2008 | Regnier | |
| 2008/0170550 A1 | 7/2008 | Liu et al. | |
| 2008/0183973 A1 | 7/2008 | Aguilera et al. | |
| 2008/0243879 A1 | 10/2008 | Gokhale et al. | |
| 2008/0243938 A1 | 10/2008 | Kottomtharayil et al. | |
| 2008/0244199 A1 | 10/2008 | Nakamura et al. | |
| 2008/0292281 A1 | 11/2008 | Pecqueur et al. | |
| 2009/0049240 A1 | 2/2009 | Oe et al. | |
| 2009/0100212 A1 | 4/2009 | Boyd et al. | |
| 2009/0112880 A1 * | 4/2009 | Oliveira | G06F 16/13 |
| 2009/0172139 A1 | 7/2009 | Wong et al. | |
| 2009/0198927 A1 | 8/2009 | Bondurant et al. | |
| 2009/0199041 A1 | 8/2009 | Fukui et al. | |
| 2009/0307292 A1 | 12/2009 | Li et al. | |
| 2009/0327312 A1 | 12/2009 | Kakivaya et al. | |
| 2010/0023941 A1 | 1/2010 | Wamatsu et al. | |
| 2010/0031000 A1 | 2/2010 | Flynn et al. | |
| 2010/0036862 A1 | 2/2010 | Das et al. | |
| 2010/0114336 A1 | 5/2010 | Konieczny et al. | |
| 2010/0114905 A1 | 5/2010 | Slavik et al. | |
| 2010/0122330 A1 | 5/2010 | McMillan et al. | |
| 2010/0161817 A1 | 6/2010 | Xiao et al. | |
| 2010/0172180 A1 | 7/2010 | Paley et al. | |
| 2010/0191783 A1 | 7/2010 | Mason et al. | |
| 2010/0217953 A1 | 8/2010 | Beaman et al. | |
| 2010/0228798 A1 | 9/2010 | Kodama et al. | |
| 2010/0262797 A1 | 10/2010 | Rosikiewicz et al. | |
| 2010/0318645 A1 | 12/2010 | Hoole et al. | |
| 2010/0332456 A1 | 12/2010 | Prahlad et al. | |
| 2011/0026439 A1 | 2/2011 | Rollins | |
| 2011/0029711 A1 | 2/2011 | Dhuse et al. | |
| 2011/0034176 A1 | 2/2011 | Lord et al. | |
| 2011/0060918 A1 | 3/2011 | Troncoso Pastoriza et al. | |
| 2011/0106795 A1 | 5/2011 | Maim | |
| 2011/0138123 A1 | 6/2011 | Gurajada et al. | |
| 2011/0213754 A1 | 9/2011 | Bindal et al. | |
| 2011/0231374 A1 | 9/2011 | Jain et al. | |
| 2011/0231524 A1 | 9/2011 | Lin et al. | |
| 2011/0264712 A1 | 10/2011 | Ylonen | |
| 2011/0264989 A1 | 10/2011 | Resch et al. | |
| 2011/0271007 A1 | 11/2011 | Wang et al. | |
| 2012/0011337 A1 | 1/2012 | Aizman | |
| 2012/0030260 A1 | 2/2012 | Lu et al. | |
| 2012/0030408 A1 | 2/2012 | Flynn et al. | |
| 2012/0047181 A1 | 2/2012 | Baudel | |
| 2012/0060072 A1 | 3/2012 | Simitci et al. | |
| 2012/0078915 A1 | 3/2012 | Darcy | |
| 2012/0096217 A1 | 4/2012 | Son et al. | |
| 2012/0147937 A1 | 6/2012 | Goss et al. | |
| 2012/0173790 A1 | 7/2012 | Hetzler et al. | |
| 2012/0179808 A1 | 7/2012 | Bergkvist et al. | |
| 2012/0179820 A1 | 7/2012 | Ringdahl et al. | |
| 2012/0185555 A1 | 7/2012 | Regni et al. | |
| 2012/0210095 A1 | 8/2012 | Nellans et al. | |
| 2012/0233251 A1 | 9/2012 | Holt et al. | |
| 2012/0278511 A1 | 11/2012 | Alatorre et al. | |
| 2012/0290535 A1 | 11/2012 | Patel et al. | |
| 2012/0290629 A1 | 11/2012 | Beaverson et al. | |
| 2012/0310892 A1 * | 12/2012 | Dam | G06F 17/30156 707/659 |
| 2012/0323850 A1 | 12/2012 | Hildebrand et al. | |
| 2012/0331528 A1 | 12/2012 | Fu et al. | |
| 2013/0013571 A1 | 1/2013 | Sorenson et al. | |
| 2013/0041931 A1 | 2/2013 | Brand | |
| 2013/0054924 A1 | 2/2013 | Dudgeon et al. | |

(56) References Cited

U.S. PATENT DOCUMENTS

| | | | |
|---|---|---|---|
| 2013/0064071 A1* | 3/2013 | Bos | H04L 12/437 370/223 |
| 2013/0067270 A1 | 3/2013 | Lee et al. | |
| 2013/0073821 A1 | 3/2013 | Flynn et al. | |
| 2013/0080389 A1* | 3/2013 | Curley | G06F 16/128 707/639 |
| 2013/0086004 A1 | 4/2013 | Chao et al. | |
| 2013/0091180 A1 | 4/2013 | Vicat-Blanc-Primet et al. | |
| 2013/0162160 A1 | 6/2013 | Ganton et al. | |
| 2013/0166818 A1 | 6/2013 | Sela | |
| 2013/0185508 A1 | 7/2013 | Talagala et al. | |
| 2013/0232313 A1 | 9/2013 | Patel et al. | |
| 2013/0235192 A1 | 9/2013 | Duinn et al. | |
| 2013/0246589 A1 | 9/2013 | Klemba et al. | |
| 2013/0262638 A1 | 10/2013 | Kumarasamy et al. | |
| 2013/0263151 A1 | 10/2013 | Li et al. | |
| 2013/0268644 A1 | 10/2013 | Hardin et al. | |
| 2013/0268770 A1 | 10/2013 | Hunt et al. | |
| 2013/0282798 A1 | 10/2013 | McCarthy et al. | |
| 2013/0288668 A1 | 10/2013 | Pragada et al. | |
| 2013/0311574 A1 | 11/2013 | Lal | |
| 2013/0346591 A1 | 12/2013 | Carroll et al. | |
| 2013/0346839 A1 | 12/2013 | Dinha | |
| 2014/0006580 A1 | 1/2014 | Raghu | |
| 2014/0007178 A1 | 1/2014 | Gillum et al. | |
| 2014/0059405 A1 | 2/2014 | Syu et al. | |
| 2014/0143206 A1 | 5/2014 | Pittelko | |
| 2014/0297604 A1 | 10/2014 | Brand | |
| 2014/0317065 A1 | 10/2014 | Barrus | |
| 2014/0335480 A1 | 11/2014 | Asenjo et al. | |
| 2014/0351419 A1 | 11/2014 | Hunt et al. | |
| 2014/0372490 A1 | 12/2014 | Barrus et al. | |
| 2014/0379671 A1 | 12/2014 | Barrus et al. | |
| 2015/0012763 A1 | 1/2015 | Cohen et al. | |
| 2015/0019491 A1 | 1/2015 | Hunt et al. | |
| 2015/0066524 A1 | 3/2015 | Fairbrothers et al. | |
| 2015/0081964 A1 | 3/2015 | Kihara et al. | |
| 2015/0106335 A1 | 4/2015 | Hunt et al. | |
| 2015/0106579 A1 | 4/2015 | Barrus | |
| 2015/0172114 A1 | 6/2015 | Tarlano et al. | |
| 2015/0220578 A1 | 8/2015 | Hunt et al. | |
| 2015/0222616 A1 | 8/2015 | Arlano et al. | |
| 2018/0011893 A1* | 1/2018 | Kimura | G06F 17/30371 |

FOREIGN PATENT DOCUMENTS

| | | |
|---|---|---|
| EP | 2834749 A1 | 2/2015 |
| EP | 2834943 A1 | 2/2015 |
| EP | 2989549 A1 | 3/2016 |
| EP | 3000205 A1 | 3/2016 |
| EP | 3000289 A2 | 3/2016 |
| EP | 3008647 A1 | 4/2016 |
| EP | 3011428 A1 | 4/2016 |
| EP | 3019960 A2 | 5/2016 |
| EP | 3020259 A1 | 5/2016 |
| EP | 3055794 | 8/2016 |
| EP | 3058466 | 8/2016 |
| JP | 2004252663 A | 9/2004 |
| JP | 2008533570 A | 8/2008 |
| JP | 2010146067 A | 7/2010 |
| JP | 2011095976 A | 5/2011 |
| JP | 2012048424 A | 3/2012 |
| WO | WO2013152357 A1 | 10/2013 |
| WO | WO2013152358 A1 | 10/2013 |
| WO | WO2014176264 A1 | 10/2014 |
| WO | WO2014190093 A1 | 11/2014 |
| WO | WO2014201270 A1 | 12/2014 |
| WO | WO2014205286 A1 | 12/2014 |
| WO | WO2015006371 A2 | 1/2015 |
| WO | WO2015054664 A1 | 4/2015 |
| WO | WO2015057576 A1 | 4/2015 |
| WO | WO2015088761 A1 | 6/2015 |
| WO | WO2015116863 A1 | 8/2015 |
| WO | WO2015120071 A2 | 8/2015 |

OTHER PUBLICATIONS

Notice of Allowance, dated Mar. 27, 2014, U.S. Appl. No. 13/441,715, filed Apr. 6, 2012.
Non-Final Office Action, dated Nov. 13, 2013, U.S. Appl. No. 13/441,592, filed Apr. 6, 2012.
Non-Final Office Action, dated May 19, 2014, U.S. Appl. No. 13/441,592, filed Apr. 6, 2012.
Final Office Action, dated Nov. 20, 2014, U.S. Appl. No. 13/441,592, filed Apr. 6, 2012.
Advisory Action, dated Feb. 19, 2015, U.S. Appl. No. 13/441,592, filed Apr. 6, 2012.
Non-Final Office Action, dated Jun. 24, 2015, U.S. Appl. No. 13/441,592, filed Apr. 6, 2012.
Final Office Action, dated Nov. 27, 2015, U.S. Appl. No. 13/441,592, filed Apr. 6, 2012.
Advisory Action, dated Feb. 19, 2016, U.S. Appl. No. 13/441,592, filed Apr. 6, 2012.
Non-Final Office Action, dated Jun. 29, 2015, U.S. Appl. No. 14/055,662, filed Oct. 16, 2013.
Non-Final Office Action, dated Aug. 11, 2015, U.S. Appl. No. 14/171,651, filed Feb. 3, 2014.
Final Office Action, dated Nov. 27, 2015, U.S. Appl. No. 14/171,651, filed Feb. 3, 2014.
Final Office Action, dated Nov. 20, 2015, U.S. Appl. No. 14/055,662, filed Oct. 16, 2013.
Advisory Action, dated Jan. 29, 2016, U.S. Appl. No. 14/055,662, filed Oct. 16, 2013.
Office Action, dated Dec. 10, 2015, U.S. Appl. No. 13/939,106, filed Jul. 10, 2013.
Non-Final Office Action, dated Jan. 11, 2016, U.S. Appl. No. 14/284,351, filed May 21, 2014.
Advisory Action, dated Jan. 12, 2016, U.S. Appl. No. 14/171,651, filed Feb. 3, 2014.
Office Action, dated Mar. 15, 2016, U.S. Appl. No. 14/171,651, filed Feb. 3, 2014.
Office Action, dated Apr. 5, 2016, U.S. Appl. No. 14/257,905, filed Apr. 21, 2014.
Office Action, dated Apr. 21, 2016, U.S. Appl. No. 14/105,099, filed Dec. 12, 2013.
Office Action, dated May 17, 2016, U.S. Appl. No. 14/303,329, filed Jun. 12, 2014.
Final Office Action, dated Jun. 1, 2016, U.S. Appl. No. 14/284,351, filed May 21, 2014.
Final Office Action, dated Jun. 1, 2016, U.S. Appl. No. 14/171,651, filed Feb. 3 2014.
Final Office Action, dated Jun. 2, 2016, U.S. Appl. No. 13/939,106, filed Jul. 10, 2013.
Advisory Action, dated Jul. 6, 2016, U.S. Appl. No. 13/939,106, filed Jul. 10, 2013.
Notice of Allowance, dated Jul. 14, 2016, U.S. Appl. No. 14/303,329, filed Jun. 12, 2014.
Non-Final Office Action, dated Jul. 25, 2016, U.S. Appl. No. 14/309,796, filed Jun. 19, 2014.
International Search Report dated Aug. 6, 2013 5901PCT Application No. PCT/US2013/035675.
Huck et al. Architectural Support for Translation Table Management in Large Address Space Machines. ISCA '93 Proceedings of the 20th Annual International Symposium on Computer Architecture, vol. 21, No. 2. May 1993. pp. 39-50.
International Search Report dated Aug. 2, 2013 5847PCT Application No. PCT/US2013/035673.
International Search Report dated Sep. 10, 2014 6362PCT Application No. PCT/US2014/035008.
Askitis, Nikolas et al., "HAT-trie: A Cache-conscious Trie-based Data Structure for Strings".
International Search Report dated Sep. 24, 2014 6342PCT Application No. PCT/US2014/039036.
International Search Report dated Oct. 22, 2014 6360PCT Application No. PCT/US2014/043283.
International Search Report dated Nov. 7, 2014 6361PCT Application No. PCT/US2014/042155.

(56) References Cited

OTHER PUBLICATIONS

International Search Report dated Jan. 21, 2015 6359PCT Application No. PCT/US2014/060176.
International Search Report dated Feb. 24, 2015 6359PCT Application No. PCT/US2014/060280.
International Search Report dated Mar. 4, 2015 6337PCT Application No. PCT/US2014/067110.
International Search Report dated Apr. 2, 2015 6340PCT Application No. PCT/US2014/045822.
International Search Report dated May 14, 2015 6450PCT Application No. PCT/US2015/013611.
International Sesarch Report dated May 15, 2015 6341PCT Application No. PCT/US2015/014492.
Invitation pursuant to Rule 63(1) dated May 19, 2015 5847EP Application No. 13772293.0.
Extended European Search Report dated Aug. 4, 2015 5901EP Application No. 13771965.4.
Dabek et al. "Wide-area cooperative storage with CFS", Proceedings of the ACM Symposium on Operating Systems Principles, Oct. 1, 2001. pp. 202-215.
Stoica et al. "Chord: A Scalable Peer-to-peer Lookup Service for Internet Applications", Computer Communication Review, ACM, New York, NY, US, vol. 31, No. 4, Oct. 1, 2001. pp. 149-160.
Extended European Search Report dated Aug. 20, 2015 5847EP Application No. 13772293.0.
Office Action dated Mar. 15, 2016 in Japanese Patent Application No. 2015-504769 filed Apr. 8, 2013.
Joao, Jose et al., "Flexible Reference-Counting-Based Hardware Acceleration for Garbage Collection," Jun. 2009, ISCA '09: Proceedings of the 36th annual internaltional symposium on Computer Architecture, pp. 418-428.
Office Action dated Mar. 29, 2016 in Japanese Patent Application No. 2015-504768 filed Apr. 8, 2013.
Notice of Allowance dated Jul. 26, 2016 for Japanese Patent Application No. 2015-504768 filed Apr. 8, 2013.

\* cited by examiner

STRUCTURAL DATA TRANSFER OVER A NETWORK

CROSS-REFERENCE TO RELATED APPLICATIONS

The present application claims benefit of U.S. provisional application No. 62/210,385 filed on Aug. 26, 2015. The disclosure of the aforementioned Applications is incorporated herein by reference for all purposes.

TECHNICAL FIELD

This disclosure relates generally to data processing, and more specifically, to methods and systems for transferring structural data over a network.

BACKGROUND

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

User data is often organized in file systems. In general, a file system can be viewed as a directed graph of objects with nodes and leaves representing files and directories. Directories can further include subdirectories and files. In a multiuser computer system, each file or directory can be assigned attributes that regulate user permission for viewing, editing, and creation of the files and directories. Attributes of directories and files are kept in the directed graph as objects.

One of the main requirements of file systems is providing a backup version or a replica of the file system. A replica of the file system can be created and stored at a remote site or network storage. A backup process can run periodically to transfer a current version of the file system to a remote site or network storage using a wide area network (WAN) and required. The backup process can be optimized to transfer only those parts of the file system that have been modified since the last backup.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments disclosed herein are directed to methods and systems for transferring structural data over a network. According to an example embodiment, a method includes providing storage (a source). The storage is operable to store a plurality of objects. Each of the plurality of objects is immutable and includes either a data object or a metadata object. The metadata object includes at least a list of references to at least one further data object or at least one further metadata object. The plurality of objects includes at least one root associated with either a creation or addition of at least one new object to the plurality of objects. The method also includes providing a further storage. The further storage is communicatively coupled to the storage via a network and configured to store at least a copy of the plurality of objects. The method also includes determining whether there is a difference between the plurality of the objects and the copy. In response to the determination, the method can be used to transfer at least one object associated with the difference from the storage to the further storage.

In some embodiments, determining whether there is a difference includes determining whether there exists a new root in the plurality of objects that is absent from the copy. In certain embodiments, the difference includes objects present in the storage and absent from the further storage. In some embodiments, the method includes adding the object to the copy.

In some embodiments, the method further includes determining that the object refers to a child object prior to transfer of the object. If the result of the determination is positive, the method includes establishing that the child object is associated with the difference. If the child object is associated with the difference, the method proceeds with transferring the child object from the storage to the further storage.

In some embodiments, the method further includes determining that transfer has started. If the result of the determination is positive, the method proceeds with protecting objects of the plurality of the objects from being deleted. The method further includes determining that transferring of the objects is finished. If the result of the determination is positive, the method proceeds with releasing the protection of the objects.

In some embodiments, the further storage is configured to store a B-tree for tracking objects of the plurality of objects required to be transferred. In certain embodiments, the method includes storing at least a unique identifier associated with the object to the B-tree prior to transferring the object. The method further includes deleting network of storage devices.

According to another example embodiment of the present disclosure, the steps of the method for transferring structural data over a network are stored on a machine-readable medium comprising instructions, which, when implemented by one or more processors, perform the recited steps.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The technology described herein allows replication of data over network to a remote network storage, such as a ring network of storage devices. The data can be structurally organized in a collection of immutable content addressable objects. This property can allow optimizing a transfer in such a way that during each transfer session only changes in structural data that have occurred since a previous transfer session are transferred for replication to the remote network storage.

According to an example embodiment, the method for transferring structural data over network includes providing storage (a source). The storage is operable to store a plurality of objects. Each of the objects is immutable and includes either a data object or a metadata object. The metadata object includes at least a list of references to at least one further data object or at least one further metadata object. The plurality of objects includes at least one root associated with either a creation or an addition of at least one new object to the plurality of objects. The method can also include providing a further storage (a target). The further storage is communicatively coupled with the storage via a network and configured to store at least a copy of the plurality of objects. The method also includes determining whether there is a difference between the plurality of the objects and the copy. In response to the determination, the method includes transferring at least one object associated with the difference from the storage to the further storage.

Figure 1:
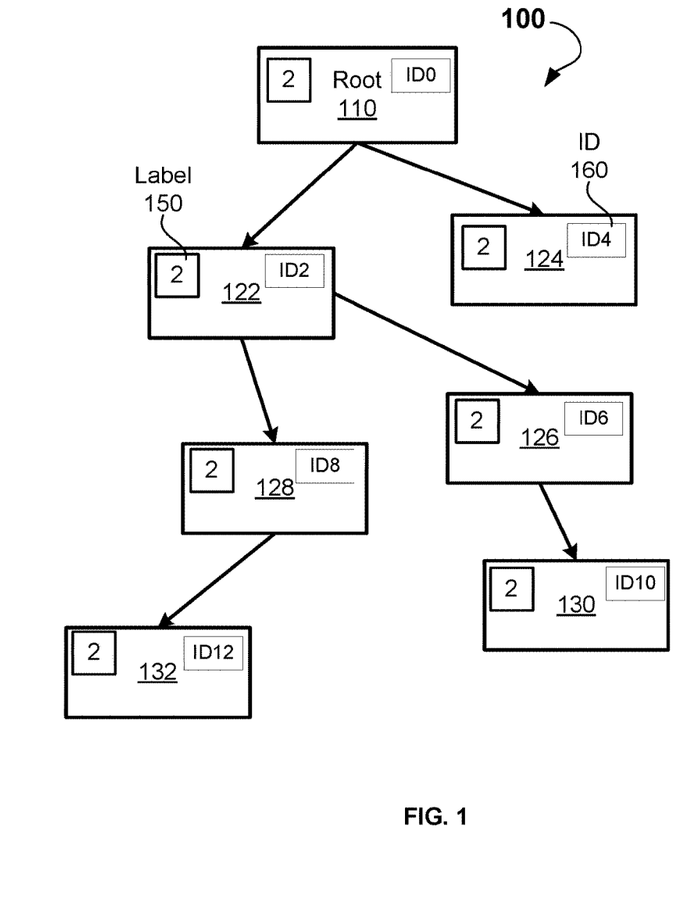
FIG. 1 is a block diagram illustrating an example collection of objects.

Various embodiments of present disclosure are directed to transferring data represented by collections. A collection is a directed graph in which each node is an immutable content-addressable object with a specific object designated as the root object (or a node). In some embodiments, immutable content-addressable objects are kept in an object store. FIG. 1 shows an example directed graph (a collection) 100 with one designated root 110. In the example shown in FIG. 1, the directed graph 100 includes objects 122-132.

In various embodiments, objects 122-132 are designated as either "data" or "metadata". The "data" objects include only uninterpreted bytes. The "metadata" objects have an internal structure and may refer to other objects, thus forming graph edges and allowing a directed graph to be constructed. In various embodiments, objects are content addressable. This means that identities of the objects are functions of object contents. An object cannot refer to itself either directly or transitively because addresses of the objects need to be calculated after content of the object is created. This property allows avoiding unbounded recursion when traversing nodes in a collection. The practical effect of this property is that the collection 100 cannot have cycles. Once an object is added to the collection, the object is assigned a unique identifier (ID) 160. Because an object in a collection is immutable, the unique ID 160 of the object never changes.

Each object 122-132 can be assigned a label 150. The label 150 can be used by a garbage collection (GC) process to determine old (earlier) objects as candidates for removal from the object store in order to reclaim the memory reserved by the old objects in memory, hard disk(s), and cluster(s). In some embodiments, each collection is associated with a version of a files system. In some embodiments, the objects in collections include entities such as an identifier node, extended attributes, a symbolic link, and parts of files and directories.

Figure 2:
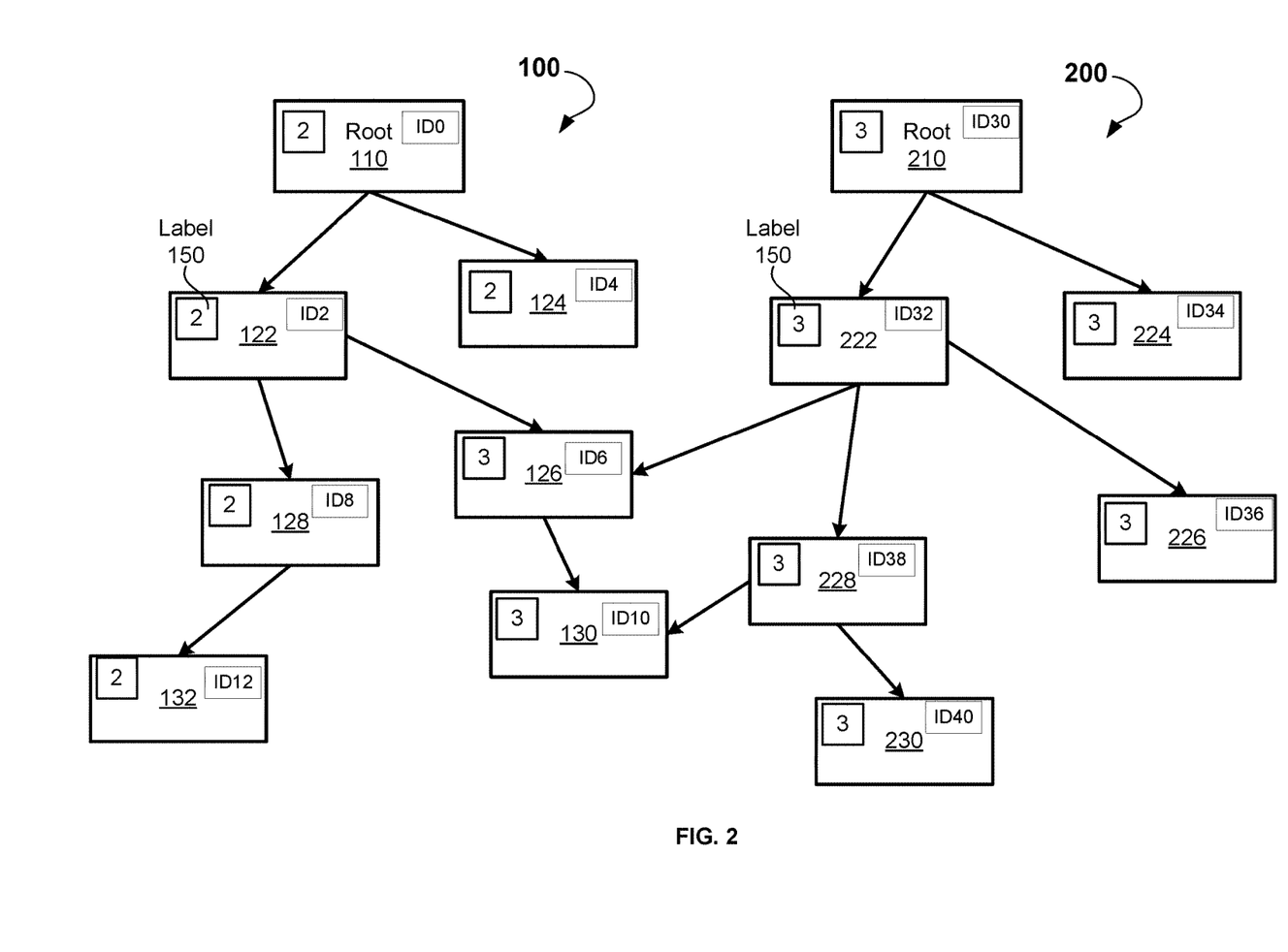
FIG. 2 is a block diagram illustrating an example of two collections sharing mutual data objects.

FIG. 2 is a block diagram showing two directed graphs 100 and 200 as having mutual objects. Directed graph 100 includes root object 110 and objects 122, 124, 126, 128, 130, and 132. Directed graph 200 includes root object 210 and objects 222, 224, 226, 228, 230, 126, and 130. The directed graphs 200 and 100 share at least objects 126 and 130. In example of FIG. 2, the directed graph 200 is an increment of directed graph 100 (shown in FIG. 1). Each of root objects 110 and 210 can be viewed as a root of a specific unique immutable graph representing a snapshot of a collection.

In order to get the effect of modification or mutation of a collection, a new graph is constructed which includes the required changes. If the new graph is an incremental change from a previous one, the new graph is likely to share a large number of its objects with the previous graph. The only change required by the new objects is a new root. The new root and all objects in a collection that can be reached by travelling from the new root are assigned a newer label 150. New label 150 is larger than label 150 that was assigned to a previous root. In example of FIG. 2, all objects in collection 100 were originally assigned a label "2". After modification of collection and addition of new 210, all objects in collection 200 are assigned a label "3".

In various embodiments, there is a need to keep copies of a collection of immutable content-addressable objects in different storages connected via a computer network, for example, a wide area network (WAN). For example, a collection and a copy of the collection can be kept in at least two geographically distant ring networks of storage devices. The first ring network referred herein to as a "source", "primary", or "server side" is the ring network from which the collection is transferred. The second ring network referred herein to as a "target", "secondary", or "client side" is the ring network the collection is transferred to. According to various embodiments, at first transfer only the source includes the collection and target that are empty. During all following transfers, the method determines an incremental change in the collection since the last transfer and transfers only those objects that are affected by the incremental change without transferring the object that has already been transferred by a previous transfer. The method of transferring relies on the fact that each object in the object store is immutable and assigned a unique identifier (ID). An ID of newly added object in a collection uniquely identifies the state of the collection.

Figure 3:
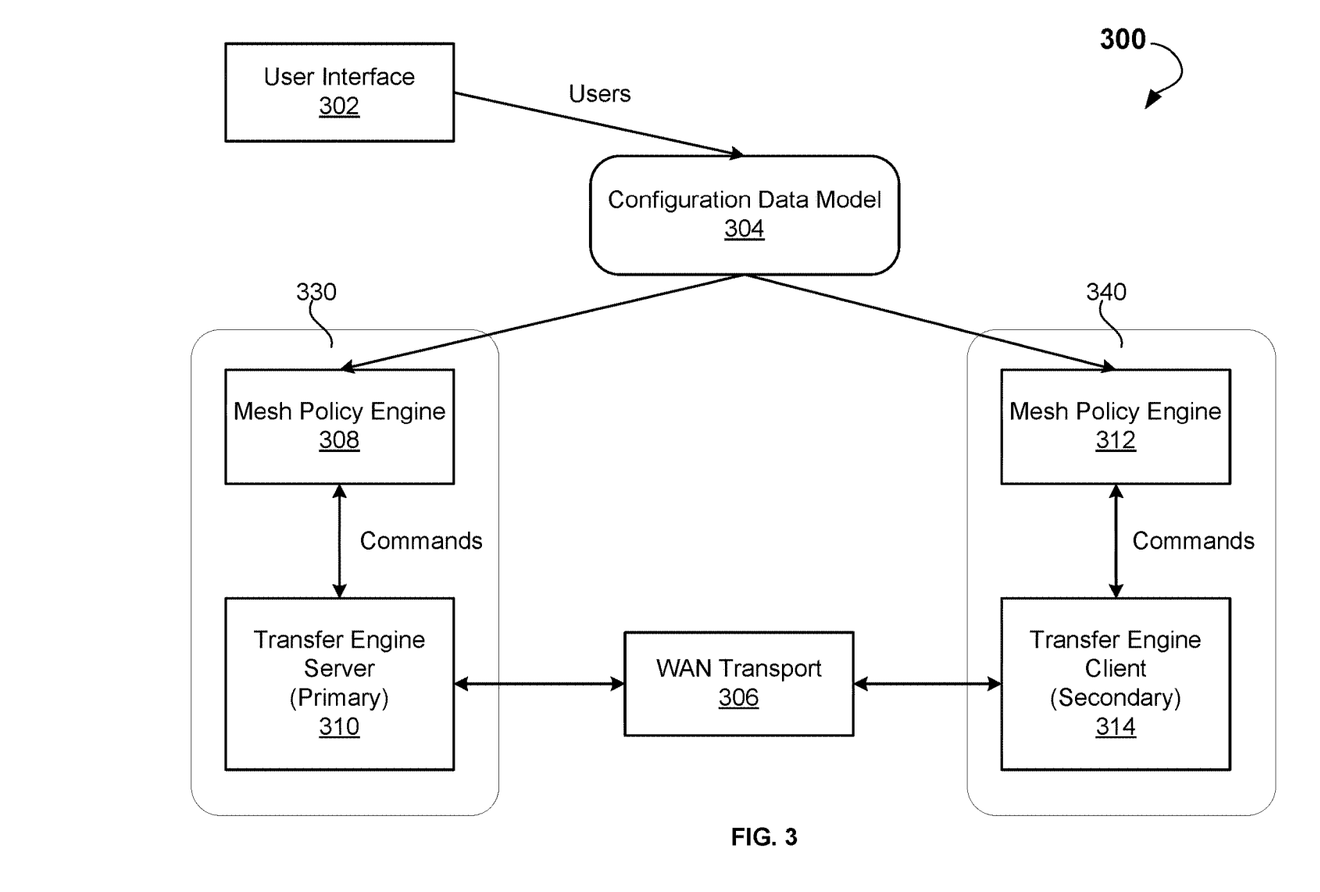
FIG. 3 is a block diagram showing an example system for transferring structural data over a network.

FIG. 3 is a block diagram showing a system 300 for organizing a transfer of collections between two rings 330 (also referred to as a server side or primary) and 340 (also referred to as a client side or secondary). The system 300 includes a user interface 302, a configuration data model 304, a mesh policy engine (MPE) 308 for ring 330, a mesh policy engine 312 for ring 340, transfer engine server 310 hosted by ring 330, transfer engine client 314 hosted by ring 340, and wide area network (WAN) transport 306.

Each of the MPE 308 and 312 is responsible for reading connection settings in the configuration data model 304 and setting up an appropriate WAN transport for mesh.

On server side, the connection settings include the ability to provide configurations for the following:

1) a "master" node to be visible externally;
2) a secure shell (SSH) server (stunnel, tunnel, or the like) to listen on a designated port for connections;

3) user authentication to allow connections without running commands by tunnelling a specific external port to a local port;

4) connecting directly to transfer server when no encryption is used.

On client side, settings include:

1) configuring SSH proxy for each encrypted connection;

2) transferring client connects to a designated address/port for a given ring, either a local proxy endpoint for encrypted connections or directly to a server.

Because the server or primary side is passive when the server is configured, the configuration of the transfer is performed on the secondary side. First, all the collections on the primary side are identified and mapped to collection names on the secondary side. The transfer parameters are configured using a primary-ring identifier, primary side collection, and secondary side collection.

Once the transfer parameters have been configured in the transfer engine, the transfer engine can initiate transfers periodically. Transfers can includes at least one of the following:

1) a completely new transfer;

2) an incremental update of a previously transferred collection;

3) continuation of an aborted partial transfer.

In some embodiments, once a connection is complete, the mesh policy engine can pause for an appropriate amount of time and then restart the transfer process. Each collection is transferred independently and can be transferred either in parallel or sequentially.

If the primary system fails, the user can promote the secondary copy to a fully usable primary copy. This can be easily achieved by making a read-write (RW) clone of the most recent complete read-only (RO) snapshot of secondary side collection with an appropriate new name and exporting the clone as a normal share. The RO secondary copy is retained as a reference starting place of the RW copy so that all changes made to the secondary copy can be easily identified.

If the primary ring comes up again without data loss, the reference copy can be used to re-integrate the changes made to the secondary ring back into the primary. Alternatively, the former primary ring can be made a secondary ring to resynchronize the former primary ring with the new state of the current primary (former secondary). Once the transfer is complete, the former primary ring can return to being the primary ring and the secondary can return to being secondary.

Figure 4:
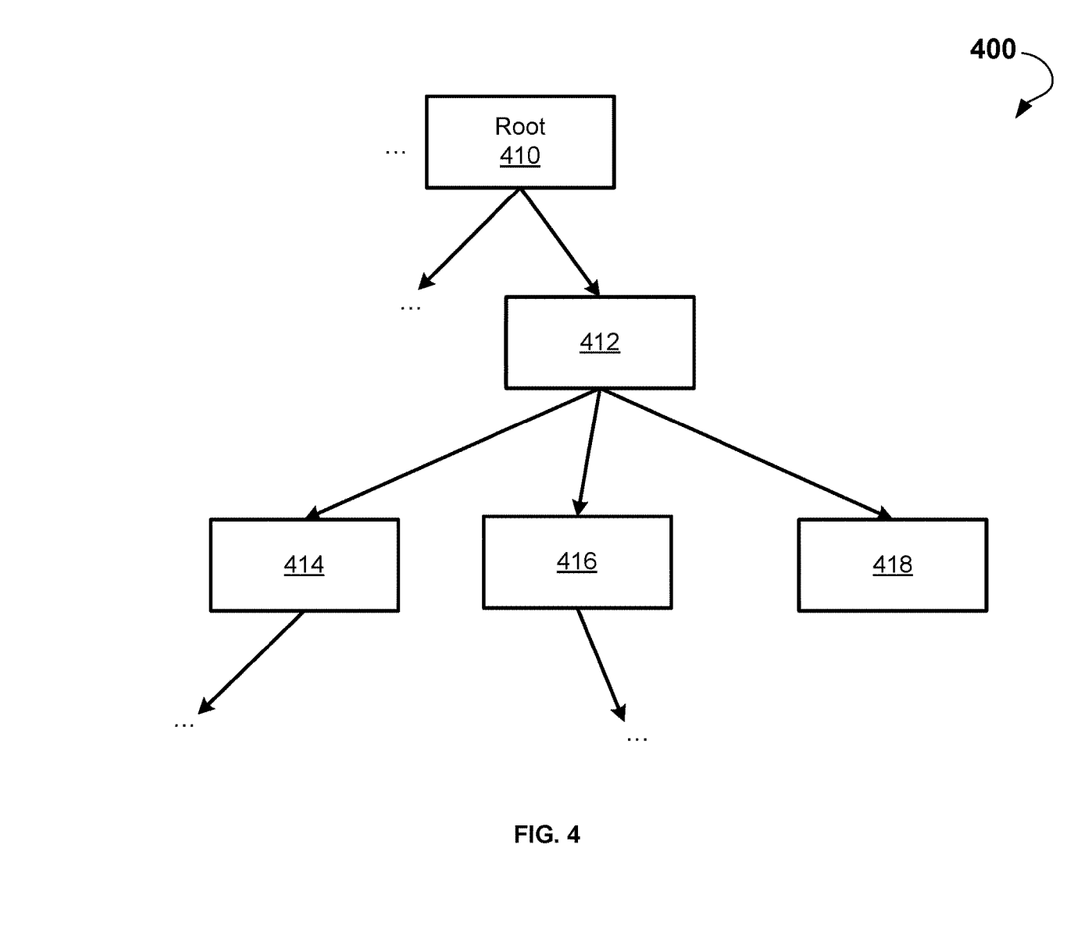
FIG. 4 is a block diagram illustrating a portion of an example collection of objects.

FIG. 4 is a block diagram illustrating a portion of an example collection 400. The collection 400 is located in source ring. When a target initiates a transfer of collection 400 from the source, the target connects to a source and requests a current root of the collection 400. If the target already holds the root 410 (i.e. root 410 of the collection 400 has been transferred in a previous transfer session) then the transfer is stopped as no additions or changes have occurred since a previous transfer or connection. If the target does not hold the root 410 (i.e. root 410 has not been transferred in any previous transfer sessions) then a transfer process is started.

In some embodiments, the transfer process is performed in a recursive manner. For a "data" object (an object that does not refer any other objects), transfer process determines whether the target holds the "data" object. The "data" object is transferred only if the target does not hold the "data" object already. For a "metadata" object (object that refers other objects) transfer process proceeds first with performing a transfer process for all of the children of the "metadata" object. After each children object is either transferred or not transferred due to the determination that the target holds the object, the transfer process is performed for the "metadata" object itself.

In example of FIG. 4, a transfer process starts with a determination as to whether the target holds the current root 410. The transfer process starts if the target does not hold the current root 410. Prior to the transfer of the current root 410, the transfer process is applied to all children of the root 410. Object 412 is a child object of the root 410 and the object 412 is a "metadata" object. Therefore, the transfer process is performed first for all children of object 412 which are objects 414, 416, and 418. The objects 418 are "data" objects (with no children) and, therefore, the transfer process determines whether the target holds the object 418. If the target does not hold the object 418, the object 418 is transferred. After the transfer process is finished for objects 412, 416 and 418, the transfer process determines whether the target holds the object 412 and transfers the object 412 if the result of the determination is negative. Finally, after the transfer process is finished for object 412, the root 410 is transferred to the target.

In some embodiments, a GC process may run concurrently with the transfer process. The GC process may remove some objects from a collection located on the source side. Transferring the objects of collections starting from the root may take a considerable period of time. During this time, the GC process may delete an object from the collection that was already selected for transfer. If the object selected for transfer is not available for transfer process, the transfer process may stop and fail. To overcome this issue, in some embodiments, a "pinning" process may be run on the source side. The pinning process can determine whether the transfer process is running on the target side. In response to the determination, the pinning process creates a clone for each of the objects that are selected by the GC process for deletion. After the pinning process determines that the transfer process is not running on the target side, the pinning process releases all clones, making them available for deletion by the GC process. At the start of the transfer, the source pins the root (and therefore its entire graph) to protect it against the GC during the transfer. Once the transfer completes, it can be unpinned.

In some embodiments, the target holds a specific B-tree or other known key/value collection. The B-tree is configured to keep track of already transferred parts of the collection. All objects selected for transfer are stored in a B-tree object store as entries.

In some embodiments, the transfer process includes a first stage and a second stage. In the first stage, as the transfer process initiated, a B-tree starts getting populated with entries that represent objects from a collection from the source side that need to be transferred. Starting from the root of the collection on the source side, the transfer process determines first whether a given object is already stored in the target. If the target does not hold the given object, the ID of the given object is placed in the B-tree. In other words, the given object is listed as pending transfer. If the given object refers to another object, then the transfer process proceeds with the determination and placing, if required, IDs of children objects in the B-tree. The process is repeated recursively from the root to leaves of the collection. At the end, the B-tree includes IDs of all objects of the collection in the source that need to be transferred.

In the second stage, the transfer process traverses the B-tree and performs an actual transfer of objects pending for transfer. The transfer is performed recursively starting from the root of the B-tree. For each node in the B-tree, the transfer process is first performed for children of the node and the objects with IDs kept in the node are transferred. When an object is transferred, the object's ID is removed from the node of the B-tree.

Figure 5:
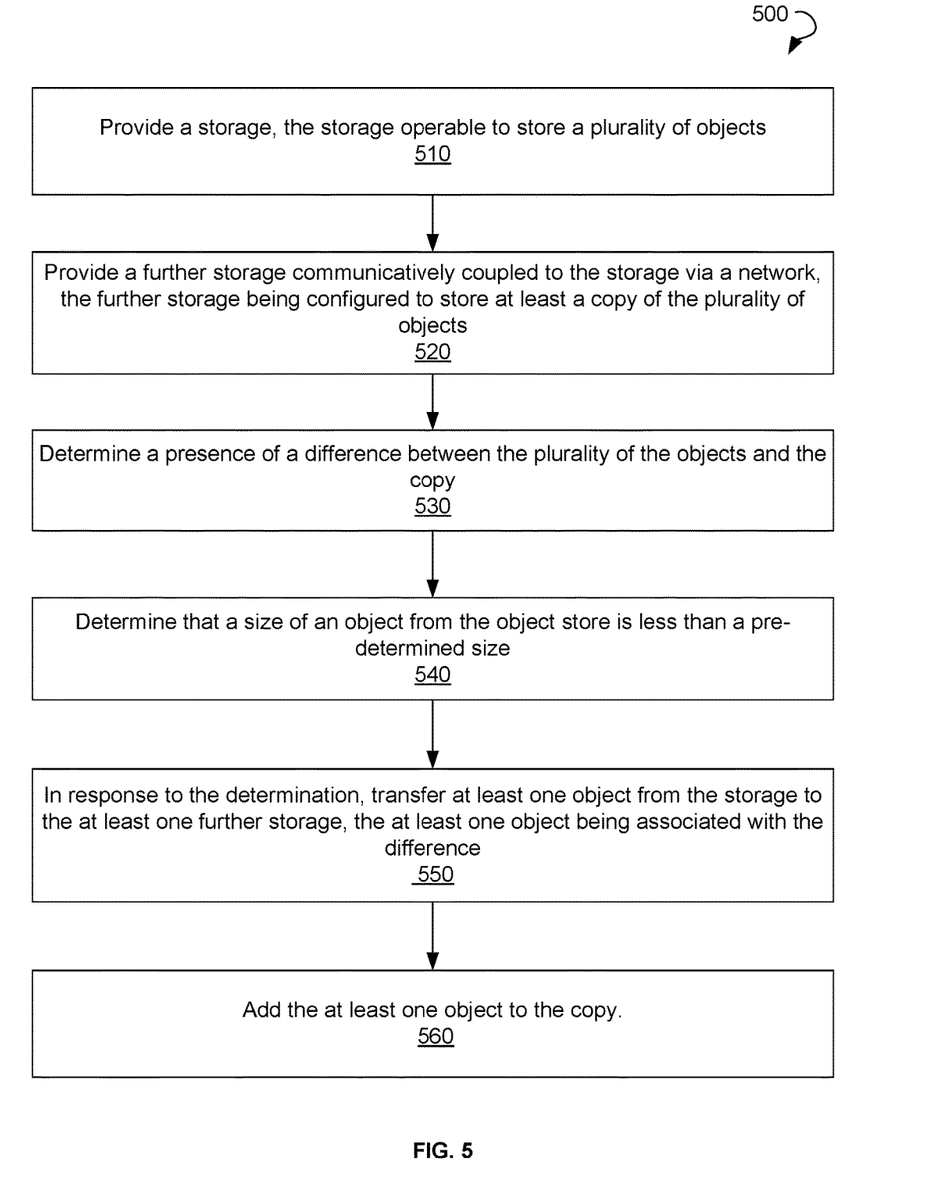
FIG. 5 is a process flow diagram showing a method for transferring structural data over a network.
Figure 7:
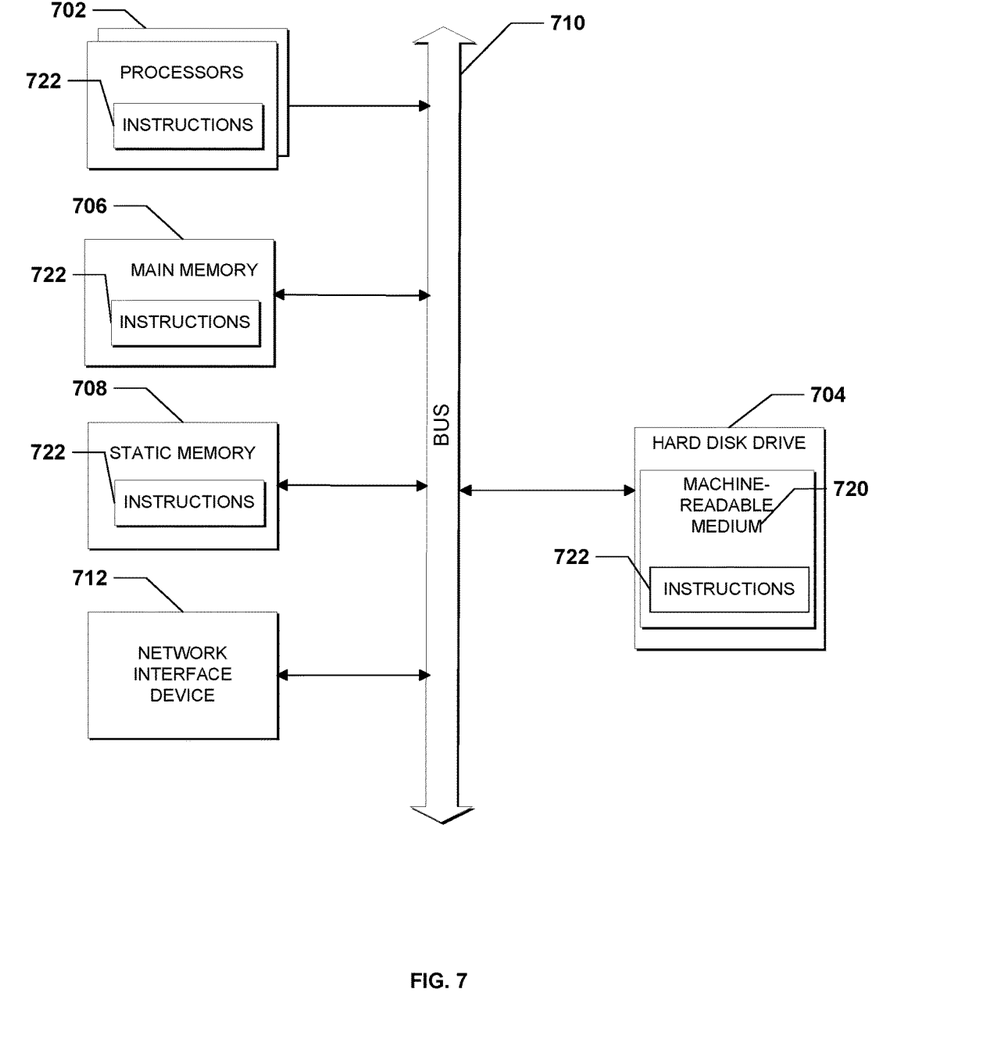
FIG. 7 shows a diagrammatic representation of a computing device for a machine in the example electronic form of a computer system, within which a set of instructions for causing the machine to perform any one or more of the methodologies discussed herein can be executed.

FIG. 5 is a process flow diagram showing a method 500 for transferring structural data over a network, according to an example embodiment. The method 500 can be implemented using a computer system. The example computer system is shown in FIG. 7.

The method 500 may commence in block 510 with providing storage (a source). The storage can store a plurality of immutable objects. Each of the objects can include either a data object or a metadata object. The metadata object includes at least a list of references to at least one further data object or at least one further metadata object. The plurality of objects includes at least one root. Each root of the plurality of objects is associated with creation or addition of at least one new object to the plurality of objects.

In block 520, method 500 can provide a further storage. The further storage (a target) can be communicatively coupled to the storage via a network. The further storage can be configured to store at least a copy of the plurality of objects. In block 530, method 500 proceeds with determining whether there is a difference between the plurality of the objects and the copy. In response to the determination, in block 540, method 500 proceeds with transferring at least one object from the storage to the further storage. The object is then associated with the difference. In block 550, method 500 can add the object to the copy.

Figure 6:
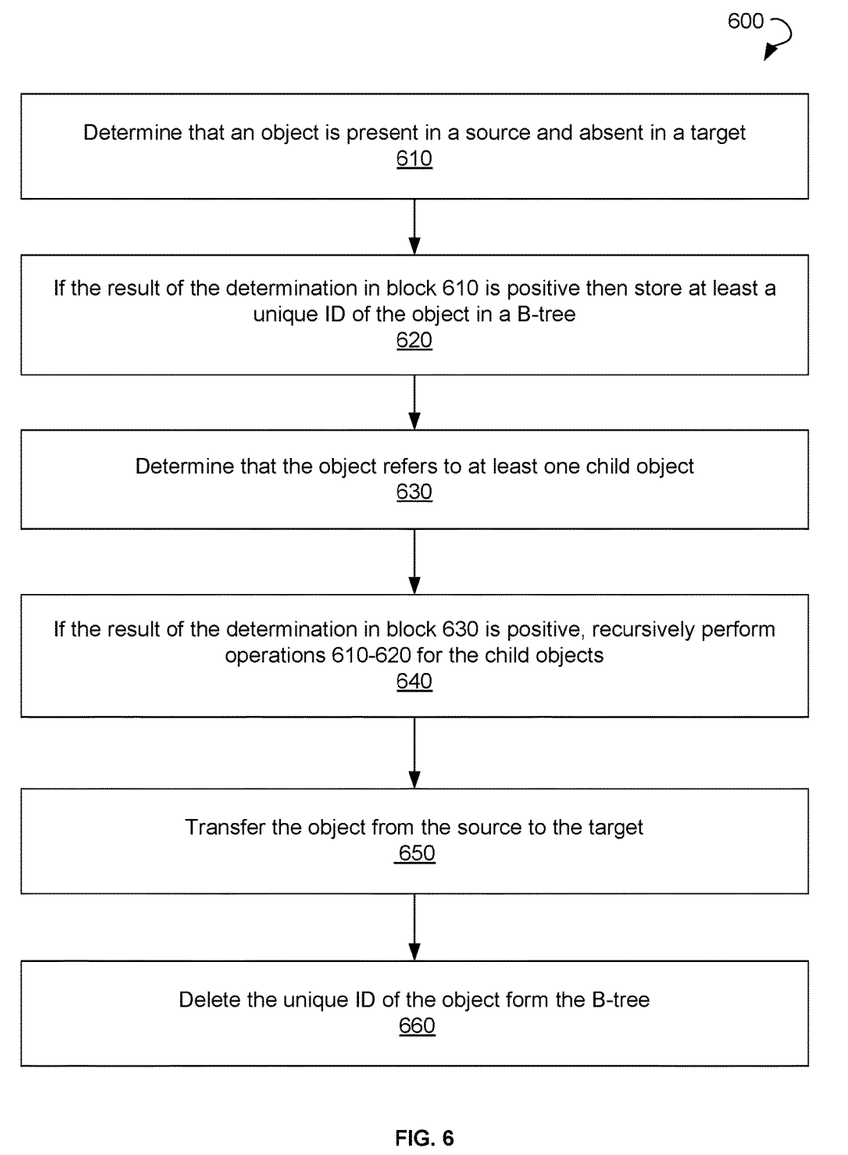
FIG. 6 is a process flow diagram showing a method for transferring an object over a network.

FIG. 6 is a process flow diagram showing a method 600 for transferring an object over a network, according to an example embodiment. The method 600 can be implemented with a computer system. The example computer system is shown in FIG. 7.

The method 600 may commence, in block 610, with determining that an object is present in the source and absent from the target. In block 620, if the result of the determination in block 610 is positive, a unique ID of the object is stored to a B-tree. In block 630, method 600 can proceed with determining that the object refers to at least one child object. In block 640, if the result of the determination in block 630 is negative, method 600 proceeds with recursively performing operations 610-620 for the child objects. In block 650, the object is transferred from the source to the target. In block 660, the unique ID of the object is deleted from the B-tree.

FIG. 7 shows a diagrammatic representation of a computing device for a machine in the exemplary electronic form of a computer system 700, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box (STB), a PDA, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702, a hard disk drive 704, a main memory 706 and a static memory 708, which communicate with each other via a bus 710. The computer system 700 may also include a network interface device 712. The hard disk drive 704 may include a computer-readable medium 720, which stores one or more sets of instructions 722 embodying or utilized by any one or more of the methodologies or functions described herein. The instructions 722 can also reside, completely or at least partially, within the main memory 706 and/or within the processors 702 during execution thereof by the computer system 700. The main memory 706 and the processors 702 also constitute machine-readable media.

While the computer-readable medium 720 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, and optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Python, Javascript, Go, or other compilers, assemblers, interpreters or other computer languages or platforms.

Thus, systems and methods for transferring structural data over a network are disclosed. Although embodiments have been described with reference to specific example embodiments, it may be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for transferring structural data over a network, the method comprising:

providing a first storage operable to store a plurality of objects, wherein:

each object of the plurality of objects is immutable and includes at least one of the following: a data object or a metadata object including at least a list of references to one or more of the following: at least one further data object or at least one further metadata object; and the plurality of objects includes at least one root object associated with at least one of the following: creation of the plurality of objects or addition of at least one new object to the plurality of objects;

providing a second storage communicatively coupled with the first storage via a network, the second storage being configured to store at least a copy of the plurality of objects;

determining whether there is a new root object present in the plurality of objects that is absent from the copy, the presence of the new root object in the plurality of objects that is absent from the copy indicating that at least one object has been added to the plurality of objects that has not yet been added to the copy; and in response to the determining that there is a new root object present in the plurality of objects that is absent from the copy, transferring the new root object and the at least one object from the first storage to the second storage.

2. The method of claim 1, further comprising adding the new root object and the at least one object to the copy.

3. The method of claim 1, further comprising, prior to transferring the at least one object:
determining that the at least one object refers to a child object;
determining whether the child object is absent from the copy; and
if the child object is absent from the copy, transferring the child object from the first storage to the second storage.

4. The method of claim 1, further comprising:
determining that the transferring of the at least one object has started; and
in response to the determining that the transferring of the at least one object has started, protecting objects of the plurality of the objects from being deleted.

5. The method of claim 4, further comprising:
determining that the transferring of the at least one object has finished; and
in response to the determining that the transferring of the at least one object has finished, removing the protection.

6. The method of claim 1, wherein the second storage is further configured to store a B-tree for tracking of objects of the plurality of objects to be transferred.

7. The method of claim 6, further comprising:
storing to the B-tree a unique identifier associated with the at least one object prior to the transferring of the at least one object; and
deleting from the B-tree the unique identifier after the transferring of the at least one object.

8. The method of claim 1, wherein the first storage includes a first ring and the second storage includes a second ring.

9. A system for transferring structural data over a network, the system comprising:
at least one processor; and
a memory communicatively coupled to the at least one processor, the memory storing instructions, which, when executed by the at least one processor, perform a method comprising:

providing a first storage operable to store a plurality of objects, wherein:
each object of the plurality of objects is immutable and includes at least one of the following: a data object or a metadata object including at least a list of references to one or more of the following: at least one further data object or at least one further metadata object; and the plurality of objects includes at least one root object associated with at least one of the following: creation of the plurality of objects or an addition of at least one new object to the plurality of objects;

providing a second storage communicatively coupled with the first storage via a network, the second storage being configured to store at least a copy of the plurality of objects;

determining whether there is a new root object present in the plurality of objects that is absent from the copy, the presence of the new root object in the plurality of objects that is absent from the copy indicating that at least one object has been added to the plurality of objects that has not yet been added to the copy; and in response to the determining that there is a new root object present in the plurality of objects that is absent from the copy, transferring the new root object and the at least one object from the first storage to the second storage.

10. The system of claim 9, wherein the method further comprises adding the new root object and the at least one object to the copy.

11. The system of claim 9, wherein the method further comprises, prior to transferring the at least one object:
determining that the at least one object refers to a child object;
determining whether the child object is absent from the copy; and
if the child object is absent from the copy, transferring the child object from the first storage to the second storage.

12. The system of claim 9, wherein the method further comprises:
determining that the transferring the at least one object has started; and
in response to the determining that the transferring of the at least one object has started, protecting objects from the plurality of the objects from being deleted.

13. The system of claim 12, wherein the method further comprises:
determining that the transferring of the at least one object has finished; and
in response to the determining that the transferring of the at least one object has finished, removing the protection.

14. The system of claim 9, wherein the second storage is further configured to store a B-tree for tracking of objects from the plurality of objects to be transferred.

15. The system of claim 14, wherein the method further comprises:
storing to the B-tree a unique identifier associated with the at least one object prior to the transferring of the at least one object; and
deleting from the B-tree the unique identifier after the transferring of the at least one object.

16. A non-transitory computer-readable storage medium having embodied thereon instructions, which, when executed by one or more processors, perform a method for organizing data, the method comprising:
  providing a first storage operable to store a plurality of objects, wherein:
    each object of the plurality of objects is immutable and includes at least one of the following: a data object or a metadata object including at least a list of references to one or more of the following: at least one further data object or at least one further metadata object; and
    the plurality of objects includes at least one root object associated with at least one of the following: creation of the plurality of objects or an addition of at least one new object to the plurality of objects;
  providing a second storage communicatively coupled with the first storage via a network, the second storage being configured to store at least a copy of the plurality of objects;
  determining whether there is a new root object present in the plurality of objects that is absent from the copy, the presence of the new root object in the plurality of objects that is absent from the copy indicating that at least one object has been added to the plurality of objects that has not yet been added to the copy; and
  in response to the determining that there is a new root object present in the plurality of objects that is absent from the copy, transferring the new root object and the at least one object from the first storage to the second storage.

* * * * *

UNITED STATES PATENT AND TRADEMARK OFFICE
CERTIFICATE OF CORRECTION

| | | |
|---|---|---|
| PATENT NO. | : 10,474,654 B2 | Page 1 of 1 |
| APPLICATION NO. | : 15/084399 | |
| DATED | : November 12, 2019 | |
| INVENTOR(S) | : Jeremy Fitzhardinge | |

It is certified that error appears in the above-identified patent and that said Letters Patent is hereby corrected as shown below:

On the Title Page

Item (73), please delete "STORAGECRAFT TECHNOLOGY CORPORATION, Draper, UT (US)" and insert -- EXABLOX CORPORATION, Sunnyvale, CA (US) -- therefor Signed and Sealed this
Seventh Day of February, 2023

Katherine Kelly Vidal
*Director of the United States Patent and Trademark Office*